(12) United States Patent
Shozo

(10) Patent No.: US 7,049,550 B2
(45) Date of Patent: May 23, 2006

(54) OVERHEATED STEAM OVEN

(75) Inventor: Kobayashi Shozo, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/834,168

(22) Filed: Apr. 29, 2004

(65) Prior Publication Data
US 2005/0051532 A1 Mar. 10, 2005

(30) Foreign Application Priority Data
Sep. 9, 2003 (KR) .................. 10-2003-0063017

(51) Int. Cl.
*F27D 11/00* (2006.01)

(52) U.S. Cl. .................. 219/401; 219/400; 219/402; 292/394; 292/397; 292/401; 126/369; 126/369.1; 99/468; 99/473

(58) Field of Classification Search ............... 219/400, 219/401, 402; 392/394, 397, 398, 401, 402; 126/348, 369, 369.1, 369.2; 99/467, 468, 99/473, 474
See application file for complete search history.

(56) References Cited

U.S. PATENT DOCUMENTS

| | | | | |
|---|---|---|---|---|
| 3,639,725 A | * | 2/1972 | Maniscalco | 219/401 |
| 5,158,064 A | * | 10/1992 | Willis et al. | 126/20 |
| 5,968,574 A | * | 10/1999 | Sann | 426/510 |
| 6,040,564 A | * | 3/2000 | Ueda et al. | 219/682 |

OTHER PUBLICATIONS

T. Junzo et al., Steam Cooking Device, 5-256455 Patent Abstracts of Japan, Oct. 5, 1993, 1 page.

* cited by examiner

*Primary Examiner*—Shawntina Fuqua
(74) *Attorney, Agent, or Firm*—Staas & Halsey LLP

(57) ABSTRACT

An overheated steam oven which is suitable for home use by simplifying a construction and reducing a size of the overheated steam oven, and which minimizes energy loss by effectively reducing heat loss due to an insulating construction thereof, and which evenly cooks foods and improves cooking efficiency by evenly heating the foods in a cooking cavity. The overheated steam oven of the present invention includes a cabinet to define a cooking cavity therein, an overheated steam generator to supply overheated steam into the cooking cavity, and a steam dispersion unit mounted to a steam inlet port of the cooking cavity to evenly discharge the overheated steam into the cooking cavity while preventing the overheated steam from being directly discharged onto foods.

25 Claims, 4 Drawing Sheets

OVERHEATED STEAM OVEN

CROSS-REFERENCE TO RELATED APPLICATIONS

This application claims the benefit of Korean Patent Application No. 2003-63017, filed Sep. 9, 2003 in the Korean Intellectual Property Office, the disclosure of which is incorporated herein by reference.

BACKGROUND OF THE INVENTION

1. Field of the Invention

The present invention relates, in general, to overheated steam ovens and, more particularly, to an overheated steam oven which is suitable for home use by simplifying a construction and reducing a size of the overheated steam oven.

2. Description of the Related Art

Generally, to cook foods, the foods may be roasted by heat, such as in a gas oven, steamed by vapor, such as in a steaming vessel, or boiled with water, such as in a cooking vessel. Also, there are methods to cook foods using microwaves, far infrared rays, and overheated steam, etc.

Cooking using the gas ovens may heat foods relatively evenly, but negatively affect a taste of the foods due to oxidation which results from contact with oxygen in air. Cooking using vapor requires plenty of water, and as a result, the foods may be insipid due to water absorption into the foods during cooking. Using cooking vessels may cause foods to be burnt by excessively heating a part of the foods. Using microwaves or far infrared rays, requires that the foods be rotated due to fixed radiating directions of the microwaves or the far infrared rays. Furthermore, controlling a temperature and moisture of the foods is difficult as the foods may easily dry during cooking. In other words, appropriately cooking foods requires that the cooking apparatuses evenly heat the foods at suitable temperatures. However, using the above-mentioned conventional cooking methods, makes satisfactory cooking conditions difficult to maintain.

Cooking using overheated steam is a method in which overheated steam is discharged into a cooking cavity. Since cooking using overheated steam evenly heats foods, the foods tend to not suffer partial burns, and an appropriate cooking temperature is easily controlled. This is accomplished by controlling a volume of the discharged overheated steam. Also, since oxidation of foods does not occur, while cooking with overheated steam, overheated steam ovens have an advantage in that cooked foods taste better.

However, conventional cooking apparatuses using the overheated steam include a cooking cavity to contain foods therein, a steam boiler to generate the overheated steam, a water tank to supply water into the steam boiler, and a plurality of steam pipes to discharge the overheated steam generated by the steam boiler into the cooking cavity. Hence, cooking apparatuses are complex and costly. Accordingly, the conventional cooking apparatuses using overheated steam are both difficult to use at home and in a wide open establishment, as in a large restaurant for business. Also, in the conventional overheated steam cooking apparatuses, the overheated steam generated by the steam boiler is discharged into the cooking cavity through the steam pipes, resulting in increased heat loss.

SUMMARY OF THE INVENTION

Accordingly, it is an aspect of the present invention to provide an overheated steam oven, which is suitable for home use, by simplifying a construction and reducing a size of the overheated steam oven.

It is another aspect of the present invention to provide an overheated steam oven, which minimizes energy loss by effectively intercepting heat due to an insulating construction thereof, and cooks foods by evenly heating the foods in the cooking cavity.

Additional aspects and/or advantages of the invention will be set forth in part in the description which follows and, in part, will be obvious from the description, or may be learned by practice of the invention.

The above and/or other aspects are achieved by providing an overheated steam oven, having a cabinet to define a cooking cavity therein, an overheated steam generator to supply overheated steam into the cooking cavity, and a steam dispersion unit mounted to a steam inlet port of the cooking cavity to evenly discharge the overheated steam into the cooking cavity while preventing the overheated steam from being directly discharged onto foods.

The steam dispersion unit may include a cover inwardly projected from an inner surface of a wall of the cooking cavity, and of which a front part is closed, with a plurality of steam discharging holes formed around the cover to pass the overheated steam.

The cover of the steam dispersion unit may include a box-shaped cover in which the plurality of steam discharging holes are formed on both sidewalls and a lower end wall thereof to pass the overheated steam.

The overheated steam oven may further include a plurality of racks respectively installed at upper and lower positions in the cooking cavity to be spaced apart from each other, with the steam discharging holes formed on both of the sidewalls of the steam dispersion unit to be aligned with a space between the plurality of racks, thus discharging the overheated steam into the space between the plurality of racks.

The cabinet may include an outer casing, and an inner casing installed in the outer casing to define the cooking cavity therein. The inner casing has a plurality of insulating walls.

The overheated steam generator may include a steam generating vessel of which an outlet is connected to and communicates with the cooking cavity, with a predetermined amount of water contained in the steam generating vessel, a first heater to generate steam, thus being installed in the steam generating vessel to be immersed in the water contained in the steam generating vessel, and a second heater mounted to an upper portion in the steam generating vessel to overheat the steam generated by the first heater.

The steam generating vessel may be an insulating vessel.

The overheated steam oven may further include a plurality of racks installed in the cooking cavity to support the foods thereon, and a plurality of food supporting units respectively provided on upper surfaces of the racks and made of a material having a heat conductivity lower than a material of the racks, thus preventing heat of the racks from directly transferring to the foods.

The overheated steam oven may further include a plurality of racks installed in the cooking cavity to support the foods thereon, and an insulating unit provided on the steam dispersion unit to prevent the steam dispersion unit and the racks from contacting with each other.

The above and/or other aspects are achieved by providing an overheated steam oven, having a cabinet to define a cooking cavity therein, an overheated steam generator provided in the cabinet to supply overheated steam into the cooking cavity, a plurality of racks installed in the cooking cavity to support foods thereon, and a plurality of food supporting units respectively provided on upper surfaces of the racks and made of a material having a heat conductivity lower than a material of the racks, thus preventing heat of the racks from directly transferring to the foods.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
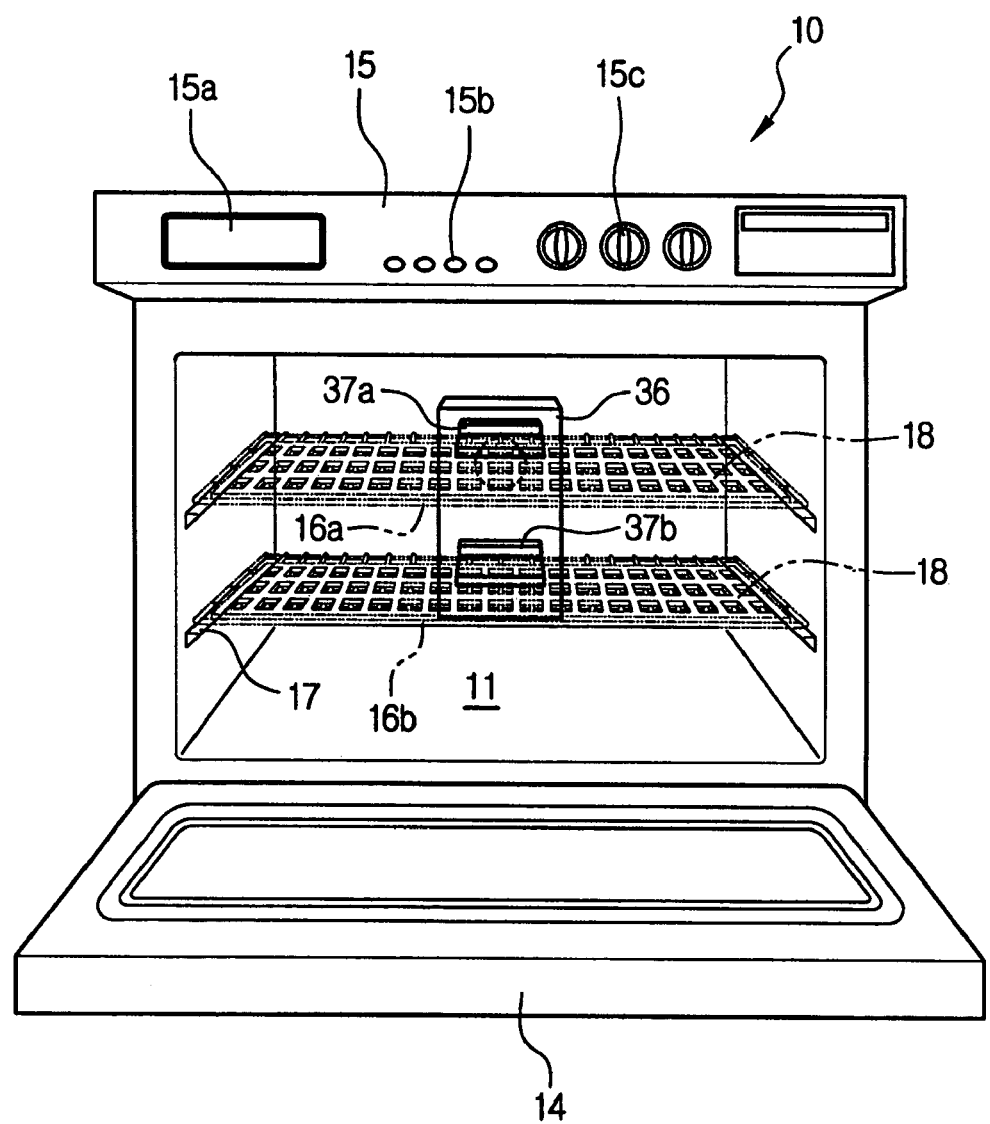
FIG. 1 is a perspective view of an overheated steam oven, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
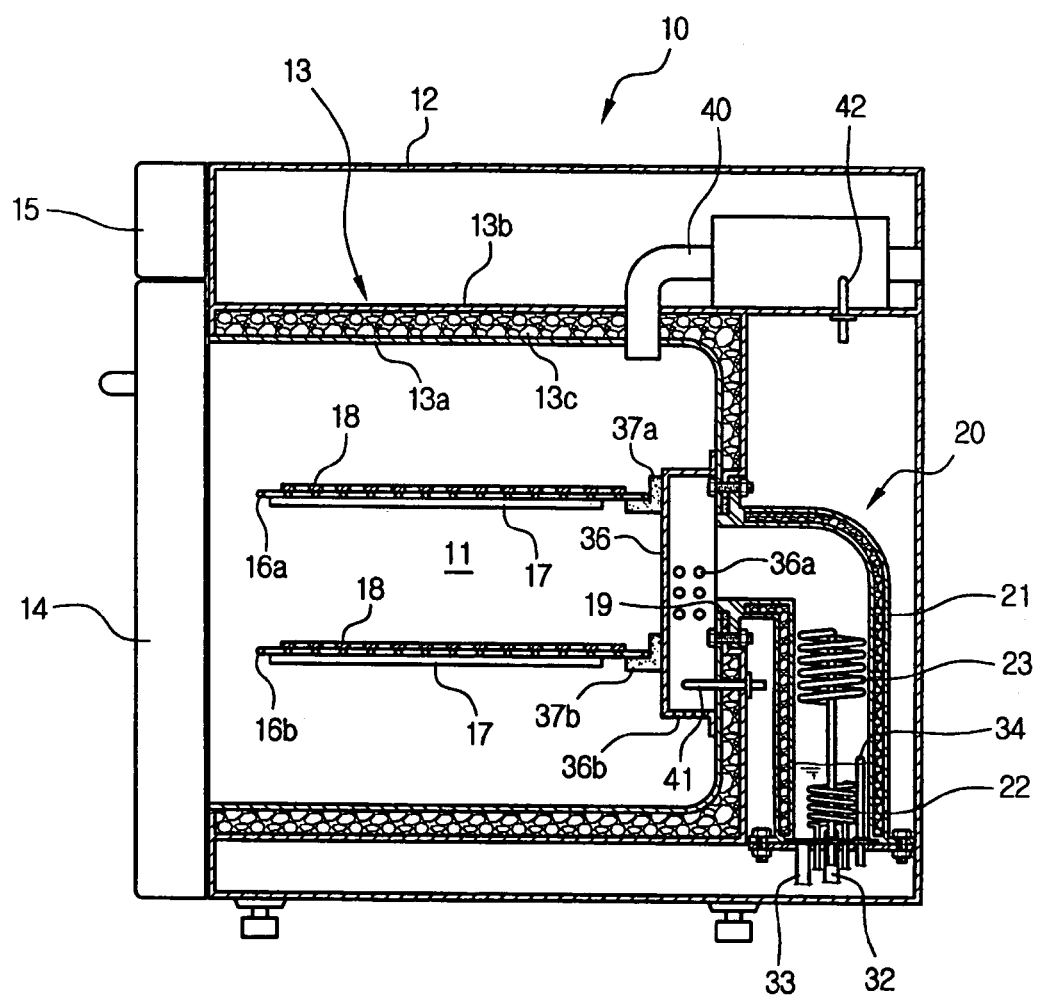
FIG. 2 is a sectional view illustrating an internal construction of the overheated steam oven of FIG. 1.

As shown in FIGS. 1 and 2, an overheated steam oven according to the first embodiment of the present invention includes a cabinet 10 to define a cooking cavity 11 therein, and an overheated steam generator 20, which is mounted to a rear wall in the cabinet 10 to supply overheated steam into the cooking cavity 11.

The cabinet 10 includes an outer casing 12, and an inner casing 13 which is installed in the outer casing 12 to be spaced apart from the outer casing 12, thus defining the cooking cavity 11 therein. The cooking cavity 11 is open at a front thereof to place and remove foods into and from the cooking cavity 11. Also, the inner casing 13 includes a first casing 13a and a second casing 13b which are spaced apart from each other to insulate the cooking cavity 11 from an outside of the cooking cavity 11. An insulating material 13c fills the space between the first casing 13a and the second casing 13b. That is, each of walls of the cooking cavity 11 includes a multi-layered panel that has a plurality of sheets spaced apart from each other, and the insulating material fills a space between the multi-layered panels.

A door 14, which is opened downward and closed upward, is attached to the open front of the cabinet 10 to allow a user to open and close the cooking cavity 11. A control unit 15, which includes a display 15a to display an operational state of the overheated steam oven thereon, various kinds of control buttons 15b, and control switches 15c, are provided at a portion of the cabinet 10 above the door 14.

Upper and lower racks 16a and 16b are provided at upper and lower positions in the cooking cavity 11 to be spaced apart from each other to respectively support foods thereon. Each of the upper and lower racks 16a and 16b is installed in the cooking cavity 11, so that the upper and lower racks 16a and 16b slide frontward and rearward along guide rails 17 which are oppositely provided on inner surfaces of both sidewalls of the inner casing 13. At this time, the upper and lower racks 16a and 16b each have a grid-patterned wire structure. Upper and lower food supporting units 18 made of Mica, Teflon, etc., which are materials having heat conductivities lower than the material of the upper and lower racks 16a and 16b, are respectively provided on upper surfaces of the upper and lower racks 16a and 16b. Due to the above-mentioned construction, heat of the upper and lower racks 16a and 16b, which are heated by overheated steam, is not directly transferred to the foods, so that lower portions of the foods, which are in contact with the upper and lower racks 16a and 16b, are prevented from being excessively heated. Accordingly, the foods are not scorched, but evenly heated by the overheated steam.

Figure 3:
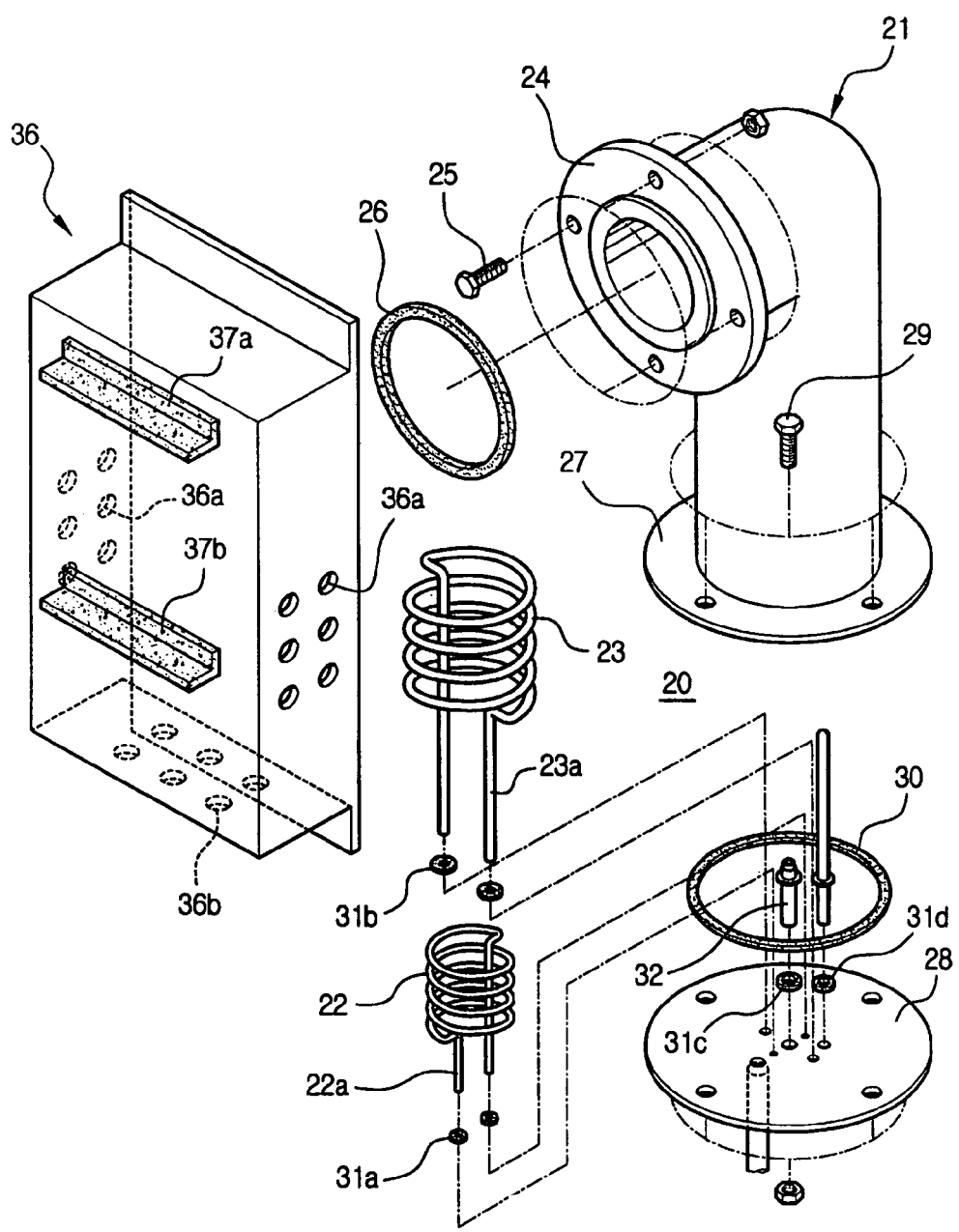
FIG. 3 is an exploded perspective view illustrating a construction of an overheated steam generator of the overheated steam oven of FIG. 2.

As shown in FIGS. 2 and 3, the overheated steam generator 20, which is provided on the rear wall of the cooking cavity 11, includes a steam generating vessel 21 of which an outlet is connected to a steam inlet port 19 provided on the rear wall of the cooking cavity 11, with a predetermined amount of water contained in the steam generating vessel 21. The overheated steam generator 20 further includes a first heater 22 which is mounted to a lower portion in the steam generating vessel 21, and a second heater 23 which is mounted to an upper portion in the steam generating vessel 21.

Figure 4:
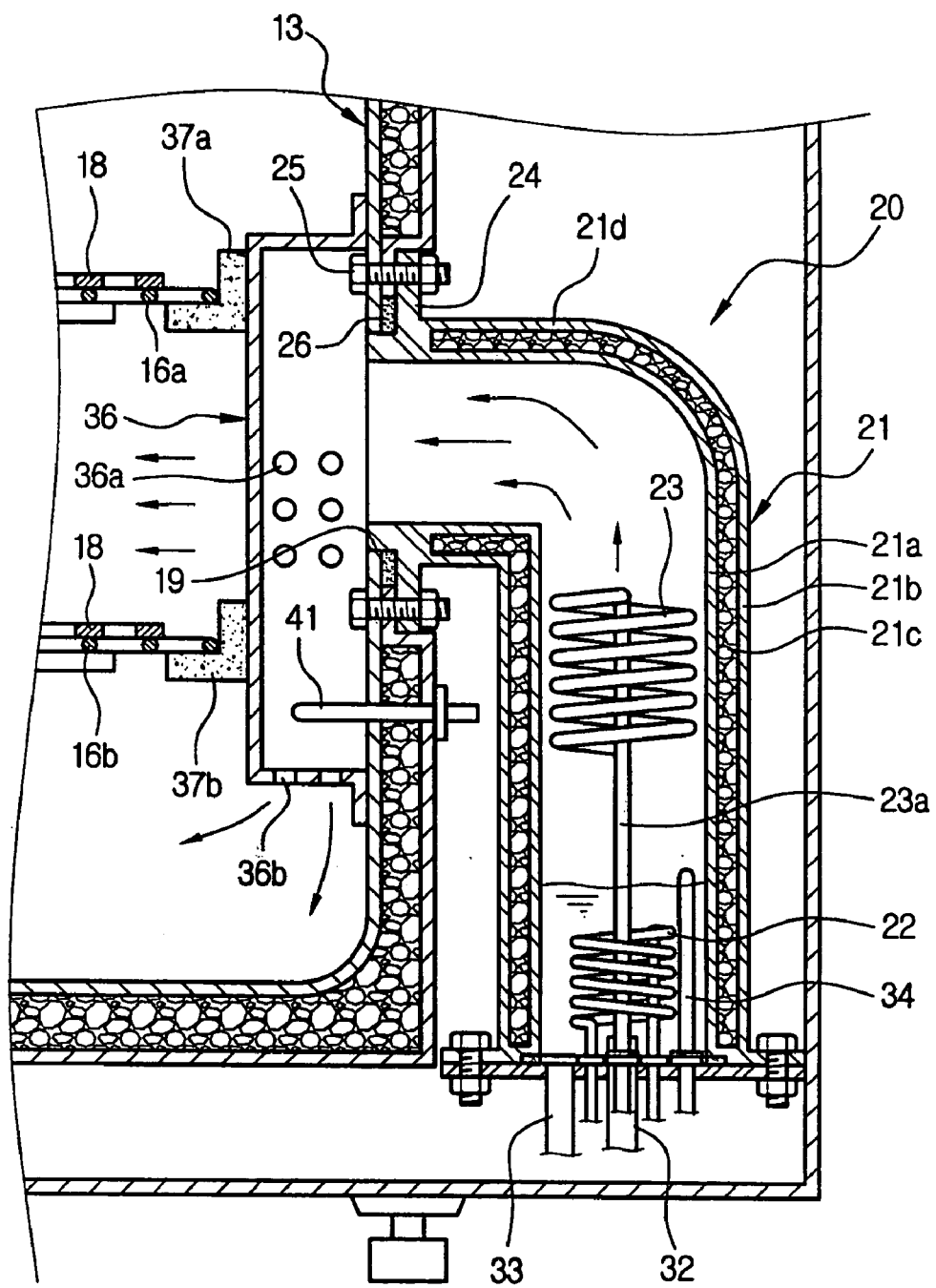
FIG. 4 is a sectional view illustrating the construction of the overheated steam generator of the overheated steam oven of FIG. 2.

As shown in FIGS. 3 and 4, the steam generating vessel 21 is a vacuum insulating vessel so that a space therein is insulated from an outside thereof, thus minimizing heat loss. The steam generating vessel 21 includes an inner vessel part 21a, and an outer vessel part 21b which surrounds an outer surface of the inner vessel part 21a while being spaced apart from the outer surface of the inner vessel part 21a. A shielding material 21c fills a space defined between the inner vessel part 21a and the outer vessel part 21b to intercept radiant heat. The space between the inner vessel part 21a and the outer vessel part 21b is sealed in a vacuum state, once the vacuum state is induced.

The steam generating vessel 21 further includes a bent part 21d which is formed by bending an upper end of the steam generating vessel 21 toward the rear wall of the cooking cavity 11. A front end of the bent part 21d, which is the outlet of the steam generating vessel 21, is connected to the steam inlet port 19 provided on the rear wall of the cooking cavity 11. At this time, an upper flange 24, which is provided around the outlet of the steam generating vessel 21, is mounted to a predetermined portion of the inner casing 13 around the steam inlet port 19 by a plurality of locking members 25, with a first packing 26 interposed between the upper flange 24 and the inner casing 13 to prevent the leakage of steam through a junction between the upper flange 24 and the inner casing 13.

A lower flange 27 is provided at a lower end of the steam generating vessel 21. A lower plate 28, which closes an opening of the lower end of the steam generating vessel 21, is mounted to the lower flange 27 by a plurality of locking members 29. A second packing 30 is interposed between the lower plate 28 and the lower flange 27 to prevent the leakage of water from the steam generating vessel 21 through a junction between the lower flange 27 and the lower plate 28.

The first heater 22, which is mounted to the lower portion in the steam generating vessel 21, and the second heater 23, which is mounted to the upper portion in the steam generating vessel 21, each have a spiral shape to maximize a heat transferring surface area thereof. First and second terminals 22a and 23a, which are respectively provided at the first and second heaters 22 and 23, are extended downward, and are supported by the lower plate 28. Accordingly, the first and second heaters 22 and 23 are supported on the lower plate 28. Also, third and fourth packings 31a and 31b each are respectively interposed between the first and second terminals 22a and 23a of the first and second heaters 22 and 23 and the lower plate 28 to prevent the leakage of water from the steam generating vessel 21 through junctions between the first and second terminals 22a and 24a and the lower plate 28. When the predetermined amount of water is fed into the steam generating vessel 21, the first heater 22, which is provided at the lower portion of the steam generating vessel 21, is immersed in the water contained in the steam generating vessel 21, and the second heater 23, which is provided at the upper portion of the steam generating vessel 21, is placed above the water, which is contained in the steam generating vessel 21 and reaches a maximum water level. Due to the above-mentioned construction, the overheated steam is generated by allowing the second heater 23 to further heat the steam generated by an operation of the first heater 22 while the steam rises toward the outlet of the steam generating vessel 21.

Also, a feed pipe 32 to feed water into the steam generating vessel 21, a drain pipe 33 to drain the water from the steam generating vessel 21, and a water level sensor 34 to monitor a level of the water contained in the steam generating vessel 21, are respectively mounted to the lower plate 28 of the steam generating vessel 21. A fifth packing 31d is provided between the feed pipe 32 and the lower plate 28 to prevent the leakage of water from the steam generating vessel 21 through a junction between the feed pipe 32 and the lower plate 28. A sixth packing 31c is provided between the water level sensor 34 and the lower plate 28 to prevent the leakage of water from the steam generating vessel 21 through a junction between the water level sensor 34 and the lower plate 28. At this time, the feed pipe 32 is connected to an external water source (not shown). The water level of the water contained in the steam generating vessel 21 is maintained by controlling the amount of the water supplied from the external water source (not shown) in response to a monitoring operation of the water level sensor 34. Also, a control valve (not shown) is provided on the drain pipe 33 to controllably drain the residual water from the steam generating vessel 21 after a cooking operation.

Also, in the overheated steam oven of the present invention, a steam dispersion unit 36 is mounted to a steam inlet port 19 of the cooking cavity 11 to evenly discharge the overheated steam generated by the overheated steam generator 20 into the cooking cavity 11 while preventing the overheated steam from being directly discharged onto foods.

The steam dispersion unit 36 has a box-shaped cover which is inwardly projected from an inner surface of the rear wall of the cooking cavity 11, and of which a front part is closed, with a plurality of steam discharging holes 36a and 36b formed around the cover to discharge the overheated steam into the cooking cavity 11. The plurality of steam discharging holes 36a and 36b of the steam dispersion unit 36 are generally formed on both sidewalls and a lower end wall of the steam dispersion unit 36. At this time, the plurality of steam discharging holes 36a, which are formed on the both sidewalls of the steam dispersion unit 36, are positioned to be aligned with a space defined between the upper rack 16a and the lower rack 16b in the cooking cavity 11.

In the above-mentioned construction, since the front part of the steam dispersion unit 36 is closed and the plurality of steam discharging holes 36a and 36b are formed around the sidewalls and the lower end wall of the steam dispersion unit 36 to discharge the overheated steam into the cooking cavity 11, a part of the foods is not excessively heated because the overheated steam is not directly discharged onto the part of the foods. The overheated steam, which is discharged from the steam discharging holes 36a formed on the both sidewalls of the steam dispersion unit 36, is supplied into the space defined between the upper rack 16a and the lower rack 16b. The overheated steam, which is discharged from the steam discharging holes 36b formed on the lower end wall of the steam dispersion unit 36, is supplied into a space defined under the lower rack 16b. Accordingly, the foods placed on the upper and lower racks 16a and 16b are evenly cooked in all directions by the overheated steam.

Also, upper and lower insulating units 37a and 37b, on which rear parts of the upper and lower racks 16a and 16b are respectively supported, are provided on a front surface of the steam dispersion unit 36. The upper and lower insulating units 37a and 37b prevent the steam dispersion unit 36 and the upper and lower racks 16a and 16b from directly contacting each other. Accordingly, the upper and lower racks 16a and 16b are not excessively heated because the steam dispersion unit 36 does not transfer heat to the upper or lower rack 16a or 16b.

As shown in FIG. 2, the overheated steam oven of the present invention further includes an exhaust duct 40 at an upper portion in the cooking cavity 11 to discharge the overheated steam from the cooking cavity 11 to an outside of the cooking cavity 11. An inlet steam temperature sensor 41 is installed in the steam dispersion unit 36 to monitor a temperature of the overheated steam discharged into the cooking cavity 11 through the steam dispersion unit 36. An outlet steam temperature sensor 42 is installed in the exhaust duct 40 to monitor a temperature of the steam discharged from the cooking cavity 11 to an outside of the cooking cavity 11. Due to the above-mentioned construction, the temperatures of the inlet and outlet overheated steam supplied into and discharged from the cooking cavity 11 are respectively monitored by the inlet and outlet steam temperature sensors 41 and 42. A control unit (not shown) of the overheated steam oven controls temperatures of the first and second heaters 22 and 23 based on temperature data monitored by the inlet and outlet steam temperature sensors 41 and 42. Therefore, the temperature of the overheated steam during cooking is controlled.

The operation of the overheated steam oven of the present invention will be described hereinbelow.

First, foods are placed on the upper and lower racks 16a and 16b of the cooking cavity 11. Thereafter, the overheated steam oven is operated and the water is fed into the steam generating vessel 21 through the feed pipe 32 of the overheated steam generator 20. At this time, the water level in the steam generating vessel 21 is controlled in response to the monitoring operation of the water level sensor 34.

After a predetermined amount of water is fed into the steam generating vessel 21, the water contained in the steam generating vessel 21 is heated by the first heater 22 to generate steam. At this time, steam is generated by boiling the water contained in the lower portion of the steam generating vessel 21 by using the first heater 22 which is immersed in the water. Thereafter, overheated steam is generated by further heating the steam by using the second heater 23 while the steam rises in the steam generating vessel 21. The overheated steam is supplied into the cooking cavity 11 through the outlet of the steam generating vessel 21. And, the foods in the cooking cavity 11 are cooked by the heat of the overheated steam. After cooking is finished, the overheated steam is discharged to the outside of the cooking cavity 11 through the exhaust duct 40 provided at the upper portion of the cooking cavity 11.

In the above-mentioned operation, since the overheated steam is discharged into the cooking cavity 11 leftward, rightward, and downward on the rear wall of the cooking cavity 11 through the plurality of steam discharging holes 36a and 36b of the steam dispersion unit 36 which is provided on the rear wall of the cooking cavity 11, the overheated steam is not directly discharged onto the foods placed on the upper and lower racks 16a and 16b, but is evenly discharged into the cooking cavity 11. Also, the overheated steam oven of the present invention prevents heat of the steam dispersion unit 36 from being transferred to the upper or lower rack 16a or 16b by the use of the upper and lower insulating units 37a and 37b which are provided on the front surface of the steam dispersion unit 36. Since heat of the upper and lower racks 16a and 16b is not transferred to the foods, due to the upper and lower food supporting units 18, the foods are appropriately heated by only the overheated steam in the cooking cavity 11. Also, since each of the walls of the cooking cavity 11 has an insulating construction, the overheated steam oven of the present invention minimizes heat loss of the overheated steam while foods are cooked.

As is apparent from the above description, in an overheated steam oven of the present invention, since an overheated steam generator is mounted on a rear wall of a cooking cavity and the construction of the overheated steam generator is simple in comparison with steam boilers of conventional overheated steam cooking apparatuses etc., the manufacturing of the present invention may be accomplished at a reduced cost. In addition, the overheated steam oven of the present invention may be used at a user's home because the installation of the overheated steam oven is simplified and the size of the oven is reduced.

Also, since a steam generating vessel of the overheated steam generator and walls of the cooking cavity each have an insulating construction, the overheated steam oven of the present invention minimizes heat loss of the overheated steam while foods are cooked.

Furthermore, since the overheated steam is evenly discharged into the cooking cavity while a steam dispersion unit prevents the overheated steam from being directly discharged onto the foods, the overheated steam oven of the present invention evenly cooks the foods.

Furthermore, in the overheated steam oven of the present invention, heat of the steam dispersion unit is not transferred to the upper and lower of racks, due to insulating units which are provided on a front surface of the steam dispersion unit. In addition, the heat of the upper and lower racks is not transferred to the foods through food supporting units which are made of a material having a heat conductivity lower than a material of the upper and lower racks and are provided on surfaces of the upper and lower racks. Accordingly, the foods are evenly cooked while being appropriately heated by the overheated steam in the cooking cavity.

Although a embodiment of the present invention has been shown and described, it would be appreciated by those skilled in the art that changes may be made in the embodiment without departing from the principles and spirit of the invention, the scope of which is defined in the claims and their equivalents.

What is claimed is:

1. An overheated steam oven, comprising:
   a cabinet to define a cooking cavity therein;
   an overheated steam generator to supply overheated steam into the cooking cavity; and
   a steam dispersion unit mounted to a steam inlet port of the cooking cavity to evenly discharge the overheated steam into the cooking cavity while preventing the overheated steam from being directly discharged onto foods, wherein an outlet of the overheated steam generator is directly connected with and communicates with the steam inlet port of the cooking cavity such that the outlet of the overheated steam generator opens into an interior of the cooking cavity, to thereby transmit the supplied overheated steam directly into the cooking cavity.

2. An overheated steam oven, comprising:
   a cabinet to define a cooking cavity therein;
   an overheated steam generator to supply overheated steam into the cooking cavity; and
   a steam dispersion unit mounted to a steam inlet port of the cooking cavity to evenly discharge the overheated steam into the cooking cavity while preventing the overheated steam from being directly discharged onto foods, wherein the steam dispersion unit comprises a cover inwardly projected from an inner surface of a wall of the cooking cavity, and of which a front part is closed, with a plurality of steam discharging holes formed around the cover to allow the overheated steam to pass therethrough.

3. The overheated steam oven according to claim 2, wherein the cover of the steam dispersion unit comprises a box-shaped cover in which the plurality of steam discharging holes are formed on both sidewalls and a lower end wall thereof to allow the overheated steam to pass therethrough.

4. The overheated steam oven according to claim 3, further comprising
   a plurality of racks respectively installed at upper and lower positions in the cooking cavity to be spaced apart from each other, wherein the steam discharging holes, formed on the both sidewalls of the steam dispersion unit to be aligned with a space between the plurality of racks, discharge the overheated steam into the space between the plurality of racks.

5. The overheated steam oven according to claim 1, wherein the cabinet comprises:
   an outer casing; and
   an inner casing installed in the outer casing to define the cooking cavity therein, the inner casing comprising a plurality of insulating walls.

6. The overheated steam oven according to claim 1, further comprising:
   a plurality of racks installed in the cooking cavity to support the foods thereon; and
   a plurality of food supporting units respectively provided on upper surfaces of the plurality of racks and made of a material having a heat conductivity lower than a material of the racks, to prevent heat of the racks from being directly transferred to the foods.

7. The overheated steam oven according to claim 1, further comprising:
   a plurality of racks installed in the cooking cavity to support the foods thereon; and an insulating unit provided on the steam dispersion unit to prevent the steam dispersion unit and the plurality of racks from contacting with each other.

8. An overheated steam oven, comprising:
a cabinet to define a cooking cavity therein;
an overheated steam generator provided in the cabinet to supply overheated steam into the cooking cavity, wherein an outlet of overheated steam generator is directly connected with and communicates with a steam inlet port of the cooking cavity such that the outlet of the overheated steam generator opens into an interior of the cooking cavity, to transmit the supplied overheated steam directly into the cooking cavity;
a plurality of racks installed in the cooking cavity to support foods thereon; and
a plurality of food supporting units respectively provided on upper surfaces of the plurality of racks and made of a material having a heat conductivity lower than a material of the racks, thus preventing heat of the racks from directly transferring to the foods.

9. The overheated steam oven according to claim 8, wherein the cabinet comprises:
an outer casing; and
an inner casing installed in the outer casing to define the cooking cavity therein, the inner casing comprising a plurality of insulating walls.

10. The overheated steam oven according to claim 9, wherein each of the walls of the cooking cavity comprises a multi-layered panel that comprises a plurality of sheets spaced apart from each other, with an insulating material filling a space between the plurality of sheets of the multi-layered panel.

11. An overheated steam oven, including a cabinet having a cooking cavity into which an overheated steam generator supplies overheated steam, and a steam dispersion unit mounted to a steam inlet port of the cooking cavity, the steam dispersion unit comprising:
a cover, inwardly from an inner surface of a wall of the cooking cavity, having a front part, parallel with the rear of the cooking cavity, which is closed;
an intermediate section to connect the cover with the steam inlet port; and
a steam discharging hole, in the intermediate section, to allow the overheated steam to pass therethrough.

12. The overheated steam oven according to claim 11, further comprising upper and lower racks respectively installed at upper and lower positions in the cooking cavity to be spaced apart from each other, wherein the steam discharging hole is aligned with a space between the plurality of racks.

13. The overheated steam over according to claim 12, wherein the steam discharging hole discharges the overheated steam into the space between the upper and lower racks.

14. The overheated steam oven according to claim 11, wherein the cabinet comprises:
an outer casing; and
an inner casing installed in the outer casing to define the cooking cavity therein, the inner casing comprising a plurality of insulating walls.

15. The overheated steam oven according to claim 11, further comprising:
a steam generating vessel, having an outlet connected to the cavity to communicate with the cooking cavity, containing a predetermined amount of water, a heater installed in the steam generating vessel, wherein the steam generating vessel comprises:
a lower flange at an end of the lower portion of the steam generating vessel;
a lower plate, mounted to the lower flange, to close an opening of a lower end of the steam generating vessel; and
a packing between the lower plate and the lower flange to prevent a leakage of water through the junction of the lower plate and the lower flange.

16. The overheated steam oven according to claim 15, further comprising:
a feed pipe to feed water into the steam generating vessel;
a drain pipe to drain water from the steam generating vessel; and
a water level sensor to monitor a level of the water contained in the steam generating vessel.

17. The overheated steam oven according to claim 16, further comprising:
a packing between the feed pipe and the lower plate to prevent a leakage of water from the steam generating vessel through a junction of the feed pipe and the lower plate.

18. The overheated steam oven according to claim 16, further comprising:
a packing between the water level sensor and the lower plate to prevent a leakage of water from the steam generating vessel through a junction of the water level sensor and the lower plate.

19. The overheated steam oven according to claim 15, wherein the steam generating vessel further comprises an insulating vessel to insulate the water.

20. The overheated steam oven according to claim 12, further comprising food supporting units, respectively provided on upper surfaces of the upper and lower racks, made of a material having a heat conductivity, which is lower than a material of the racks, to prevent heat of the racks from being directly transferred to the foods.

21. The overheated steam oven according to claim 11, further comprising an insulating unit provided on the steam dispersion unit to prevent the steam dispersion unit and the upper and lower racks from contacting each other.

22. An overheated steam oven, including a cabinet having a cooking cavity into which an overheated steam generator supplies overheated steam, and a steam dispersion unit mounted to a steam inlet port of the cooking cavity, the steam dispersion unit comprising:
a cover, inward from an inner surface of a wall of the cooking cavity, having a front part, parallel with the rear of the cooking cavity, which is closed;
an intermediate section to connect the cover with the steam inlet port;
a steam discharging hole, in the intermediate section, to allow the overheated steam to pass therethrough;
a rack, installed in the cooking cavity, having upper surfaces and a food supporter which is provided on the upper surfaces, wherein the food supporter is made of a material having a heat conductivity which is lower than that of a material of the rack, to prevent heat from the rack being directly transferred to the foods.

23. The overheated steam oven according to claim 22, further comprising:
an outer casing; and
an inner casing installed in the outer casing to define the cooking cavity therein, the inner casing comprising a plurality of insulating walls.

24. The overheated steam oven according to claim 22, further comprising an insulating unit provided on the steam dispersion unit to prevent the steam dispersion unit and the rack from contacting each other.

25. An overheated steam oven, including a cabinet to having a cooking cavity into which an overheated steam generator supplies overheated steam, and a steam dispersion unit mounted to a steam inlet port of the cooking cavity, the steam dispersion unit comprising:

a cover, inward from an inner surface of a wall of the cooking cavity, having a front part, parallel with the rear of the cooking cavity, which is closed;

an intermediate section to connect the cover with the steam inlet port; and a steam discharging hole, in the intermediate section, to allow the overheated steam to enter the cooking cavity leftward, downward, and rightward of the wall.

* * * * *

UNITED STATES PATENT AND TRADEMARK OFFICE
CERTIFICATE OF CORRECTION

| | | |
|---|---|---|
| PATENT NO. | : 7,049,550 B2 | Page 1 of 1 |
| APPLICATION NO. | : 10/834168 | |
| DATED | : May 23, 2006 | |
| INVENTOR(S) | : Kobayashi Shozo | |

It is certified that error appears in the above-identified patent and that said Letters Patent is hereby corrected as shown below:

Column 8, Line 40, after "comprising" insert --:--.

Column 9, Line 51, change "over" to --oven--.

Signed and Sealed this

Twenty-eighth Day of November, 2006

JON W. DUDAS
*Director of the United States Patent and Trademark Office*